Patented Feb. 3, 1925.

1,524,883

UNITED STATES PATENT OFFICE.

RURIC C. ROARK, OF BALTIMORE, MARYLAND.

INSECTICIDE.

No Drawing.      Application filed August 6, 1923. Serial No. 655,956.

*To all whom it may concern:*

Be it known that I, RURIC C. ROARK, a citizen of the United States of America, and resident of Baltimore, Baltimore city, State of Maryland, have invented certain new and useful Improvements in and Relating to Insecticides, of which the following is a specification.

This invention relates to arsenical insecticides; and the objects and nature of the invention will be readily understood by those skilled in the art in the light of the following explanation of examples from among others within the spirit and scope of my discovery and invention.

An object of the invention is to produce an arsenical insecticide that will overcome certain disadvantages inherent in insecticides of the arsenical class heretofore proposed, and that will not be destructive to growing vegetation yet will be efficient in the control of chewing insects that infest such vegetation.

Arsenical compounds are the most effective and practical insecticides at present used for the control of chewing insects infesting orchards, gardens, etc. Compounds of arsenic, in addition to being poisonous to insects are unfortunately also very toxic to growing plants. This toxicity increases with increasing solubility in water. For this reason only relatively insoluble arsenic compounds, such as zinc arsenite, and lead and calcium arsenates can be applied to growing vegetation. The solubility of these compounds in water is so low that only a slight injurious action is exerted on the leaves of the plant while at the same time when these compounds are swallowed by an insect its gastric and intestinal juices dissolve enough arsenic to cause its death.

In order to obtain arsenic in a form relatively insoluble in water it has heretofore been necessary to get it into the form of either arsenous or arsenic acid and then combine the acid with a base to form an arsenite or an arsenate. The resulting compound contains a large percentage of base, together with a considerable proportion of oxygen and in some cases, hydrogen. For example, the most widely used arsenical insecticide is dilead arsenate, $PbHAsO_4$. The percentage of metallic arsenic (As) in standard commercial dilead arsenate of 30% arsenic pentoxide content, is only 19.56%. This means that 5 pounds of standard lead arsenate must be used in order to obtain 1 pound of the actual insect killing constituent—arsenic. The proportion of arsenic in "triplumbic" arsenate is only about two-thirds that in the dilead arsenate, necessitating the use of still larger quantities of insecticide to obtain the same result. While it is true that zinc arsenite, Paris green, and calcium arsenate contain greater percentages of arsenic than dilead arsenate these compounds are never used on fruit trees and their general applicability is much more restricted than that of lead arsenate.

I have discovered that arsenic in the form of certain arsenides is a very effective stomach poison and at the same time is so slightly soluble in water as not to burn the most delicate vegetation. Furthermore, the proportion of arsenic in an arsenide is very much greater than that in an arsenite or arsenate of the same base. This means that the same dosage of arsenic may be obtained with a smaller weight of insecticide, or conversely, that a higher concentration of arsenic may be obtained with the same weight of material. This latter is a particularly desirable feature because certain insects require much more arsenic to produce a fatal result than others, and will consume a considerable area of leaf surface sprayed with lead arsenate, for example, before ingesting a toxic dose of arsenic. When the insecticide upon the leaf surface contains a greater proportion of arsenic a smaller area of leaf will furnish sufficient arsenic to kill caterpillars feeding upon it and hence foliage injury will be greatly reduced. While it is possible to increase the amount of arsenic per square inch of leaf surface by increasing the amount of insecticide used per 100 gallons of spray, this is possible only within certain limits. An increase in the concentration of arsenic in the insecticide permits the securing of the same result over a much wider range and with greater economy.

My invention involves an insecticide the essential ingredient of which is formed by one or more of certain arsenides.

I have found the asenides of iron, nickel, cobalt and copper to be especially valuable as insecticides. While synthetic arsenides formed in the laboratory may be used, I prefer the arsenides occurring native as various minerals. For example, the minerals domeykite ($Cu_3As$); leucopyrite ($Fe_3As_4$);

lollingite ($FeAs_2$); skutterudite ($CoAs_3$); niccolite (NiAs) and chloanthite or rammelsbergite ($NiAs_2$) when finely powdered are effective stomach poisons for insects, and do not injure peach foliage—a foliage recognized as especially susceptible to injury from soluble arsenic.

It is not essential to use these minerals in pure form; it is satisfactory to employ the rock or ore in which they are found and of which they form a constituent part. For use as insecticides these minerals are first crushed to convenient size and are then reduced to a very fine powder in a pulverizing mill, such as a Raymond or Fuller-Lehigh mill. I prefer to use a powder of such fineness that not less than 90% passes a 200 mesh test sieve.

With regard to the fineness of the powder, in general the finer the powder the quicker and more complete the insecticidal action. A powder which will just pass an 80 or 100 mesh sieve is effective, but a powder which passes a 200 mesh sieve is very much more effective. It is very difficult to get a powder 100% of which will pass a 200 mesh sieve, but it is possible and practical to obtain one 90% of which will pass a 200 mesh sieve—the other 10% being fine enough to pass a 100 mesh sieve. I would say that 100 mesh would be as coarse as the powder should be used. There is no limit on the fineness except the mechanical one of obtaining it.

A pulverized arsenide may be applied as an insecticide upon growing vegetaion exactly as is lead arsenate. It may be dusted or sprayed. It may be combined with powdered sulphur, lime-sulphur solution, nicotine solution, Bordeaux, etc., to form a combination insecticide and fungicide. In all cases the dosage is based on the content of arsenic (As), which percentage or content appears on the package or container or is otherwise made known to the user.

What I claim is:

1. An insecticide containing one or more of the arsenides of metals of the iron group reduced to a powdered form of a fineness suitable for dusting or spraying purposes.

2. An insecticide containing one or more of the arsenides of metals of the iron group reduced to a powdered form of a fineness so that approximately 90 per cent will pass through a substantially 100 mesh test sieve.

RURIC C. ROARK.